United States Patent
Kovacs et al.

(10) Patent No.: US 7,430,221 B1
(45) Date of Patent: Sep. 30, 2008

(54) FACILITATING BANDWIDTH ALLOCATION IN A PASSIVE OPTICAL NETWORK

(75) Inventors: Andras Kovacs, Reston, VA (US); Cha'Masian Mallory, Raleigh, NC (US); Kenneth Waters, Garner, NC (US)

(73) Assignee: Alcatel Lucent, Paris (FR)

( * ) Notice: Subject to any disclaimer, the term of this patent is extended or adjusted under 35 U.S.C. 154(b) by 880 days.

(21) Appl. No.: 10/746,075

(22) Filed: Dec. 26, 2003

(51) Int. Cl.
*H04J 3/18* (2006.01)

(52) U.S. Cl. .......................... 370/477; 370/468; 713/2; 717/168

(58) Field of Classification Search ................ 370/477, 370/468; 713/2; 717/168
See application file for complete search history.

(56) References Cited

U.S. PATENT DOCUMENTS

| | | | |
|---|---|---|---|
| 6,023,467 A * | 2/2000 | Abdelhamid et al. ..... | 370/236.2 |
| 6,282,683 B1 * | 8/2001 | Dapper et al. ................ | 714/746 |
| 6,327,675 B1 * | 12/2001 | Burdett et al. ................. | 714/11 |
| 6,546,014 B1 * | 4/2003 | Kramer et al. ......... | 370/395.41 |
| 6,603,822 B2 * | 8/2003 | Brede et al. .................. | 375/340 |
| 6,636,527 B1 * | 10/2003 | Lee et al. ..................... | 370/465 |
| 6,778,550 B1 * | 8/2004 | Blahut ........................ | 370/443 |
| 6,950,878 B2 * | 9/2005 | Kwok et al. ................ | 709/242 |
| 6,980,519 B1 * | 12/2005 | Horn et al. .................. | 370/235 |
| 7,016,356 B1 * | 3/2006 | Profumo et al. .......... | 370/395.4 |
| 2002/0063924 A1 * | 5/2002 | Kimbrough et al. ......... | 359/125 |
| 2003/0081626 A1 * | 5/2003 | Naor et al. ................... | 370/431 |
| 2004/0047286 A1 * | 3/2004 | Larsen et al. ................ | 370/216 |
| 2004/0213286 A1 * | 10/2004 | Jette et al. .................... | 370/466 |
| 2005/0047783 A1 * | 3/2005 | Sisto et al. ..................... | 398/71 |
| 2005/0089027 A1 * | 4/2005 | Colton ........................ | 370/380 |
| 2006/0209825 A1 * | 9/2006 | Carroll et al. ................ | 370/390 |
| 2006/0233197 A1 * | 10/2006 | Elmoalem et al. ........... | 370/468 |
| 2006/0275036 A1 * | 12/2006 | Hochbaum et al. ............ | 398/67 |
| 2007/0162565 A1 * | 7/2007 | Hanselmann ............... | 709/219 |
| 2007/0169083 A1 * | 7/2007 | Penubolu et a. ............. | 717/168 |

OTHER PUBLICATIONS

Sun Microsystems, Netra ft 1800 Upgrade Path Software Installation Manual, Patches 107368-17 and 108145-10, 1991,☐☐http://www.sun.com/products-n-solutions/hardware/docs/pdf/806-3827-10.pdf.*
Gummalla, et al, A Flexible Architecture for EPON, 2001, Broadcom.*

\* cited by examiner

*Primary Examiner*—Huy D. Vu
*Assistant Examiner*—Luat Phung (57) ABSTRACT

A bandwidth allocation system configured for in-service upgrading of bandwidth allocation functionality comprises dynamic bandwidth allocation software, a first processor, a second processor, first memory and second memory. The bandwidth allocation software includes an image representing firmware configured for determining bandwidth allocation requirements. A first processor interprets the firmware for facilitating determination of bandwidth allocation settings for a plurality of optical network termination units of a PON system. The second processor interprets the software for managing information upon which the bandwidth allocation settings are dependent.

21 Claims, 7 Drawing Sheets

FACILITATING BANDWIDTH ALLOCATION IN A PASSIVE OPTICAL NETWORK

FIELD OF THE DISCLOSURE

The disclosures made herein relate generally to passive optical networks and more particularly to methods and systems configured for facilitating bandwidth allocation in a passive optical network.

BACKGROUND

Passive Optical Networking (PON) enables the shared use of fiber for services such as data, voice and video over most of the distance between a central office and service subscriber sites. PON is significantly less expensive to deploy and operate due to the compact size and passive nature of much of the equipment comprised by the PON facilities. For example, a passive optical splitter that fans the fiber out to service subscribers in a PON is relatively small, uses no electronics and requires no power source.

Current and emerging PON solutions offer cost-effective, end-to-end solutions that are capable of delivering a combination of high-demand services. Specific examples of such current and emerging PON solutions include Broadband PON (BPON), Ethernet PON (EPON) and Gigabit PON (GPON). Examples of services that can be provided via such PON solutions include various types of telephony services, data transmission services and video services. Signals for such services are transported optically from the central office (CO) or headend (HE) to an optical-network termination unit (ONT) at a service subscriber's site. The ONT is configured to provide optical network termination functionality and, in some implementations, to also provide conventional network interface device functionality.

Dynamic bandwidth allocation allows for bandwidth allocation for active ONTs to be adjusted dependent upon factors such as real-time bandwidth requirements, QOS commitments and the like. Conventional dynamic bandwidth allocation solutions, such as for idle-cell detection and for buffer status reporting, are known. Such conventional dynamic bandwidth allocation solutions are implemented in hardware-based approaches.

One limitation of hardware-based approaches to dynamic bandwidth allocation is that they are incompatible with proprietary interfaces of many PON processor chips. Another limitation is that certain components (e.g., field programmable gate arrays) of such hardware based approaches carry data traffic and require a temporary break in the data traffic while reloading new instructions during a dynamic bandwidth allocation service upgrade. In many environments, such a break in data traffic is deemed to be unacceptable. Another limitation is that dynamic bandwidth allocation (hereafter "DBA") functionality is fixed (e.g., cannot be adjustable while the hardware is serving traffic) and is only able to operate according a preset DBA method. This prevents dynamic bandwidth allocation from being instantaneously more, or less sensitive to bandwidth requests.

Therefore, methods and systems configured for providing dynamic bandwidth allocation functionality in a manner that overcomes shortcomings associated with conventional approaches for providing such functionality would be useful and advantageous.

DETAILED DESCRIPTION OF THE DRAWING FIGURES

The disclosures made herein relate to facilitating dynamic bandwidth allocation functionality and, more generally, bandwidth allocation functionality in passive optical networks. Specifically, methods and systems in accordance with embodiments of the disclosures made herein are novel and advantageous in that bandwidth allocation functionality is facilitated through the use of firmware rather than solely hardware and software. Accordingly, such methods and systems allow for in-service upgrading of firmware for altering bandwidth allocation functionality, for in-service adjustment to bandwidth allocation processes by software and for compatibility with proprietary passive optical network interfaces.

Methods and system in accordance with embodiments of the disclosures made herein improve the bandwidth allocation efficiency for PON systems. To allocate bandwidth, such methods and systems utilize idle-cell detection functionality. The amount of bandwidth allocated to ONTs by a PON processor chip is controlled by hardware (e.g., of a field programmable gate array—FPGA) that of a bandwidth allocation system that is external to the PON system. The purpose of firmware loaded on this FPGA is to control one or more grant generators by dynamically calculating the amount of bandwidth allocated to each of the ONTs.

Through use of a firmware approach to facilitating bandwidth allocation functionality approach, revised bandwidth allocation firmware (e.g., dynamic bandwidth allocation firmware) can be separately reloaded in-service without reinitializing associated hardware (e.g., of a field programmable gate array) or breaking a datastream. The newly loaded firmware can then immediately be activated, thereby altering the method by which bandwidth is allocated to the PON processor chip and ONTs.

Figure 1:
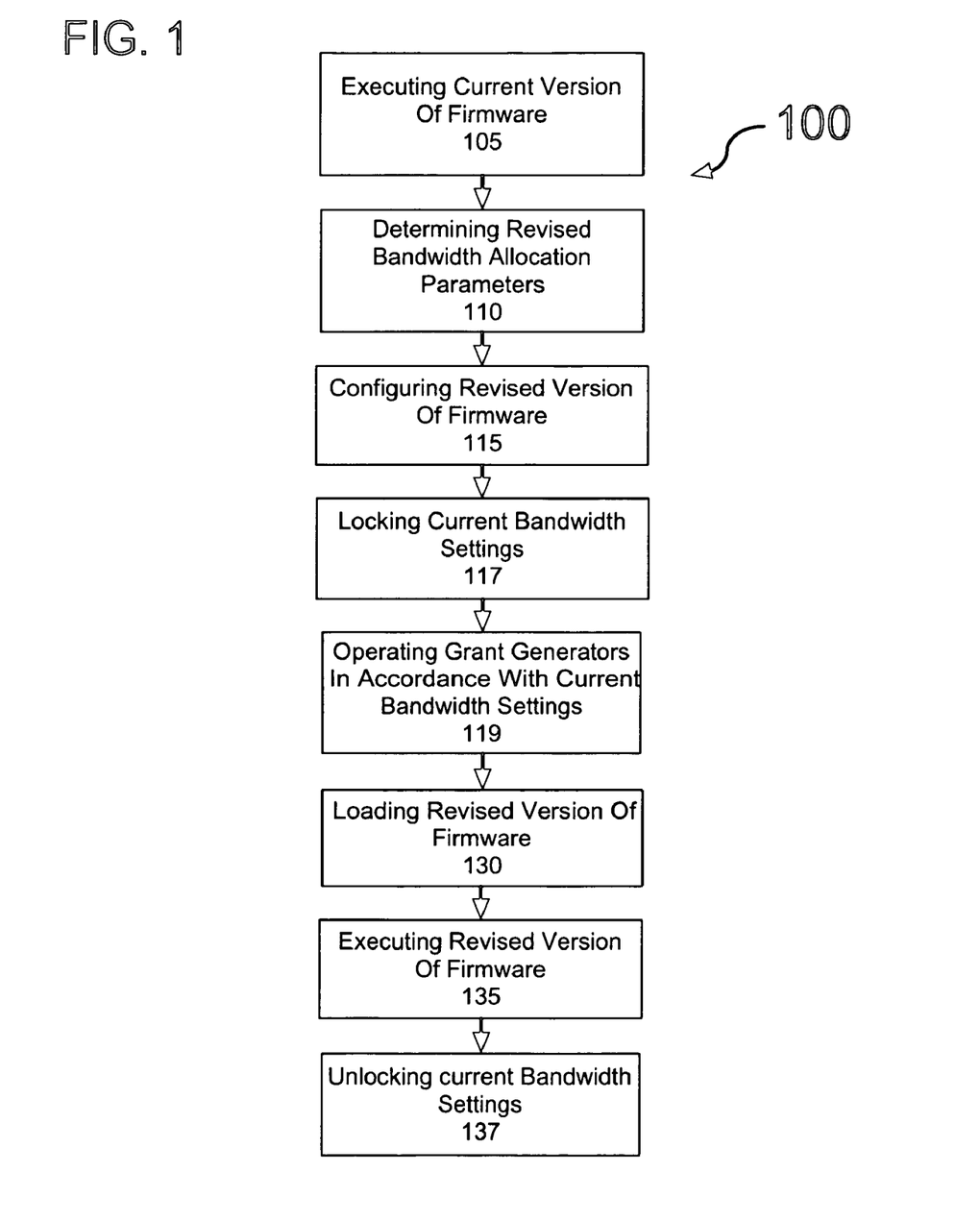
FIG. 1 depicts a method for facilitating in-service loading of a revised version of dynamic bandwidth allocation firmware in accordance with an embodiment of the disclosures made herein.

Turning now to discussion of specific drawings, a method 100 for facilitating in-service loading of a revised version of dynamic bandwidth allocation firmware in accordance with an embodiment of the disclosures made herein is depicted in FIG. 1. The method 100 comprises an operation 105 for executing a current version of bandwidth allocation firmware from first memory (e.g., RAM). While executing the current version of bandwidth allocation firmware, an operation 110 for determining revised bandwidth allocation parameters is performed. Examples of such revised bandwidth allocation parameters include revised bandwidth levels assigned to each of a plurality of active ONTs in a PON.

After determining the revised bandwidth allocation parameters and in response to a corresponding request from a host processor, an operation 115 is performed for configuring a revised version of the bandwidth allocation firmware to reflect the revised bandwidth allocation parameters, an operation 117 is performed for locking current bandwidth settings (i.e., last known bandwidth settings) during the firmware upgrade process and an operation 119 is performed for operating grant generators in accordance with the current bandwidth settings. For example, the host processor instructs a softcore processor within a field programmable gate array comprising the dynamic bandwidth allocation firmware to maintain current bandwidth settings during the firmware upgrade process. In essence this is similar to performing a processor cache lock. In such an example, this would be done by keeping the softcore processor idle and letting grant generators of the field programmable gate array operate solely on the last-known bandwidth setting for active ONTs. To this end, the current algorithm resident in the FPGA's internal 'RAM' space would be discarded and executing instead from within the read only memory space of the field programmable gate array. The read only memory of the field programmable gate array has instructions to keep the Softcore processor in whatever state is requested of it by the host processor. In the case of in-service upgrade, the host processor instructs the softcore processor to remain idle.

After configuring the revised version of the bandwidth allocation firmware and/or as instructed by the host processor, an operation 130 is performed for loading the revised version of bandwidth allocation firmware resident in second memory into the first memory. After the revised version on the bandwidth allocation firmware is loaded into the first memory, an operation 135 is performed for initiating execution of the revised version of the bandwidth allocation firmware from the first memory and an operation 137 is performed for removing the lock on the current bandwidth settings. For example, the host processor instructs the softcore processor to execute the new version of the dynamic bandwidth allocation firmware now resident in the first memory (which is RAM of the field programmable gate array in this example) and dynamic adjustment of bandwidth settings is now occurring again based on calculations from the softcore processor (i.e., the grant generators are now adhering to the requests of the softcore processor). Accordingly, in-service upgrade of the bandwidth allocation firmware is advantageously provided.

Figure 2:
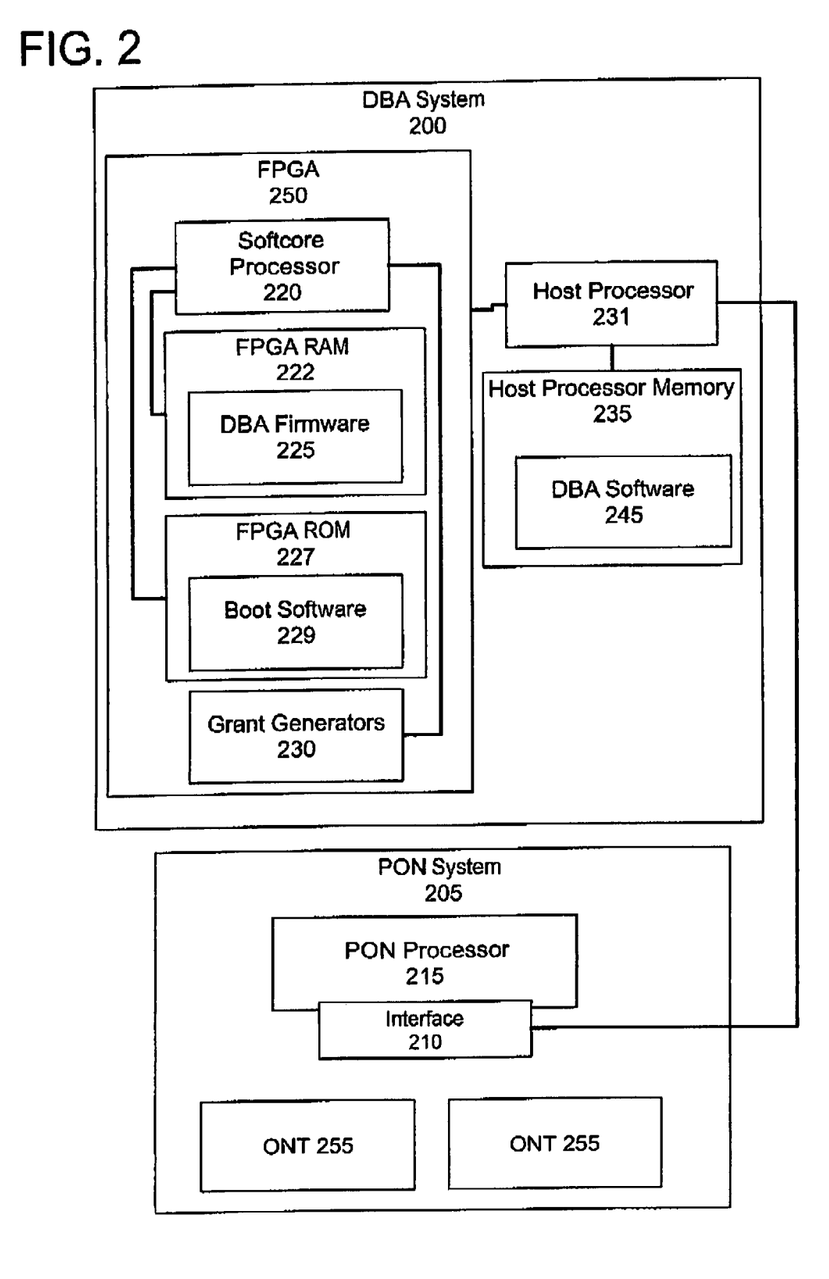
FIG. 2 depicts a dynamic bandwidth allocation system in accordance with an embodiment of the disclosures made herein.

FIG. 2 depicts a dynamic bandwidth allocation system 200 in accordance with an embodiment of the disclosures made herein. The dynamic bandwidth allocation system 200 is an embodiment of a system configured for carrying out the method 100 depicted in FIG. 1. The dynamic bandwidth allocation system 200 is connected to a PON System 205. The dynamic bandwidth allocation system 200 is connected to the PON system 205 through an interface 210 of a PON processor 215. Through this arrangement information is transmitted between the DBA system 200 and the PON system 205.

The bandwidth allocation system 200 comprises a field programmable gate array 207 including a softcore processor 220 (i.e., a processor), random access memory 222, dynamic bandwidth allocation firmware 225 (i.e., bandwidth allocation firmware) residing in the random access memory 222, read only memory 227, boot software 229 containing code to respond to a limited set of the host processor's requests, and one or more grant generators 230. The random access memory 222 and the read only memory 227 are comprised by first memory of the dynamic bandwidth allocation system.

The bandwidth allocation system further comprises a host processor 231 configured for controlling various aspects of dynamic bandwidth allocation functionality, host processor memory 235 (i.e., second memory) and dynamic bandwidth allocation software 245 (i.e., bandwidth allocation software) residing on the host processor memory 235. The host processor memory 235 comprises at least one of random access memory and read only memory. The field programmable gate array is an example of a device comprising hardware from which the dynamic bandwidth allocation firmware 225 is executable.

The dynamic bandwidth allocation software 245 includes an image representing the dynamic bandwidth allocation firmware 225. As controlled by the host processor, the image representing the dynamic bandwidth allocation firmware is provided in the FPGA random access memory 222. The code of the boot software 229 is a relatively low level code set that listens to a limited set of commands from the host processor, mainly to facilitate upgrades. Preferably, it also contains softcore reset vectors, memory stack maintenance, interrupt servicing, etc.

The softcore processor 220 interprets the dynamic bandwidth allocation firmware 225 for facilitating determination of bandwidth allocation requirements for a plurality of optical network termination units 255 of the PON system 205. Furthermore, the softcore processor 220 analyzes idle-cell information, determines bandwidth allocation parameters dependent upon the idle-cell information and facilitates transmission of at least a portion of the bandwidth allocation parameters to the PON processor 215. The one or more grant generators 230 are configured for producing data grants in accordance with the bandwidth allocation requirements determined by the softcore processor 220.

The dynamic bandwidth allocation firmware 225 is configured for determining bandwidth allocation requirements, such as altering bandwidth allocation levels dependent upon actual usage requirements and/or quality of service commitments. The softcore processor is executable according to a current version of the dynamic bandwidth allocation firmware 225 in the FPGA random access memory 222 prior to reloading with a revised version of the dynamic bandwidth allocation firmware, if an upgrade is necessary, and is executable in accordance with instructions in FPGA read-only memory 227 when the revised version of the dynamic bandwidth allocation firmware is being loaded into the FPGA random access memory 222. The revised version of the dynamic bandwidth allocation firmware 225 alters bandwidth allocation functionality with respect to functionality provided by the current version of the dynamic bandwidth allocation firmware 225.

The dynamic bandwidth allocation software 245, which is resident in Host Processor memory 235, is configured for fine-tuning dynamic bandwidth allocation functionality in several ways without having to lock associated dynamic bandwidth allocation calculations. In one embodiment, the dynamic bandwidth allocation software 245 independently adjusts the size of the time interval at which dynamic bandwidth allocation recalculations occur. In another embodiment, the dynamic bandwidth allocation software 245 independently adjusts the amount of bandwidth by which each ONT 255 of the PON system 205 is modified every time bandwidth is recalculated. In another embodiment, the dynamic bandwidth allocation software 245 adjusts the number of idle-cells that must be received in order to consider each ONT 255 idle vs. needing more bandwidth. In yet another embodiment, the dynamic bandwidth allocation software 245 adjusts the size of a buffer zone, which is used to alleviate problems arising due to the delay in the idle-cell feedback from the PON system 205. By changing these parameters, the sensitivity of the dynamic bandwidth allocation system 200 is affected, such that reactions to idle-cell feedback from the PON system 205 are altered, accordingly.

It is important to note that changing these parameters while the dynamic bandwidth allocation firmware 225 is executing does not cause conflicts.

The disclosed approach to dynamic bandwidth allocation functionality is different from conventional solutions (e.g., hardware solutions), because the dynamic bandwidth allocation firmware 225 is used in conjunction with hardware (e.g., of a field programmable gate array 250). The dynamic bandwidth allocation firmware 225 is downloadable to the random access memory 235, which is accessible by the softcore processor 220. By running dynamic bandwidth allocation firmware 225, the softcore processor 220 interacts with other hardware of the field programmable gate array (not specifically shown) to send bandwidth allocation information to the PON processor 215. Idle-cell information is sent up from the PON system 205 indicating the amount of unused bandwidth of each ONT 255. This idle-cell information is recorded by hardware of the field programmable gate array 250. Guided by the dynamic bandwidth allocation firmware 225, and settings imposed by the dynamic bandwidth allocation software 245, the softcore processor 220 analyzes this information and makes a decision on which ONT 255 needs more or less bandwidth.

Once all of the ONTs are analyzed, the dynamic bandwidth allocation firmware 225 instructs the softcore processor 220 to update the one or more grant generators 230. The one or more grant generators 230 produce data grants for the ONTs through the PON processor 215. The dynamic bandwidth allocation firmware 225 addresses instances of over-subscription, which is when the ONTs need more bandwidth than available on the entire PON system 205. In such instances of over-subscription, the bandwidth for at least a portion of the ONTs gets scaled down according to adjustable quality of service levels.

An advantage of the disclosed firmware-based approach to dynamic bandwidth allocation functionality is that software can tune the firmware while in-service, such that the DBA system becomes instantaneously more or less sensitive to bandwidth requests. Such in-service tuning functionality is not possible in existing hardware-based approaches as they are fixed and only able to operate according their preset dynamic bandwidth allocation processes. Using the disclosed firmware-based approach, a dynamic bandwidth allocation system can be easily and readily adjusted on a system-by-system basis without interrupting service-to-service subscribers.

Figure 3:
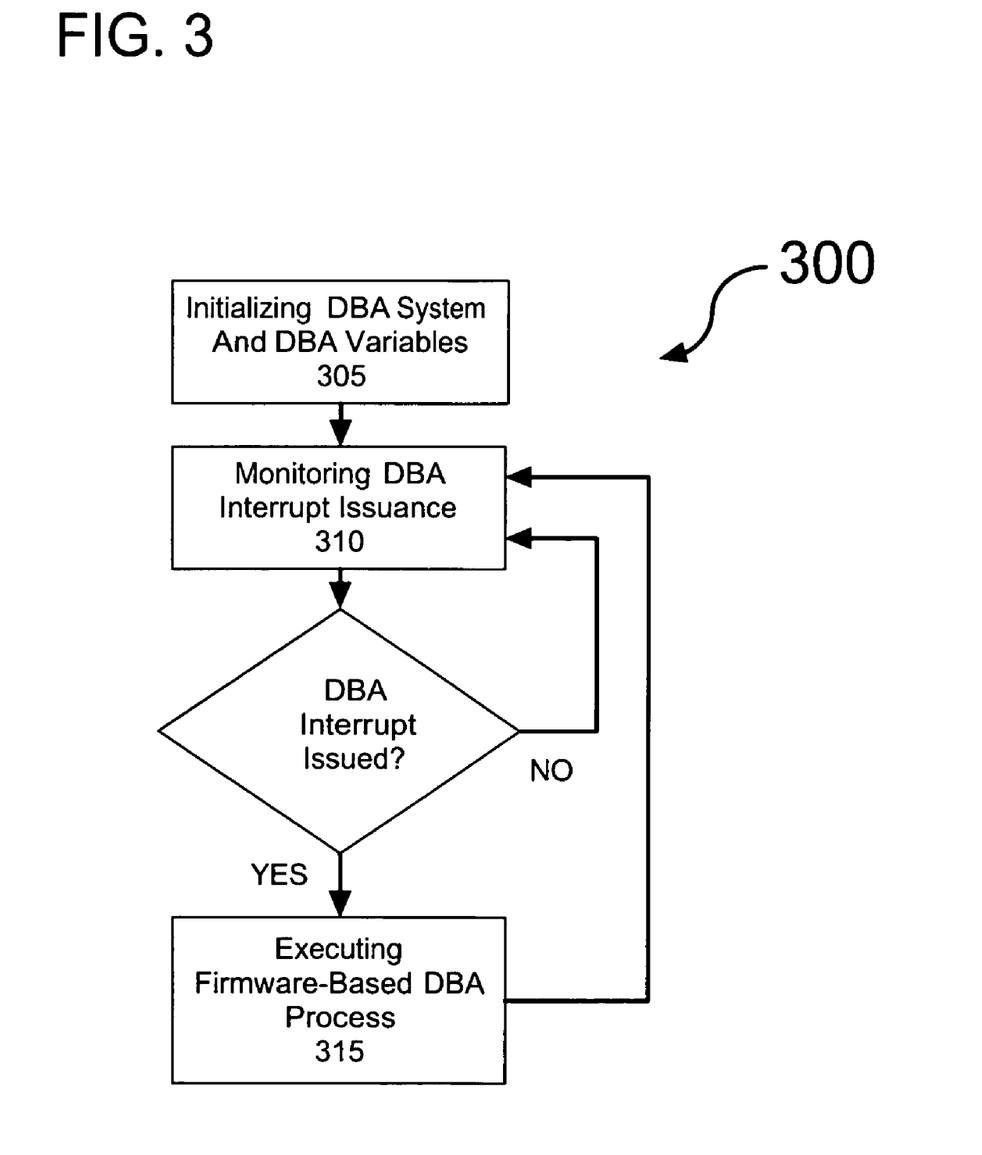
FIG. 3 depicts a method for facilitating dynamic bandwidth allocation in accordance with an embodiment of the disclosures made herein.
Figure 4A:
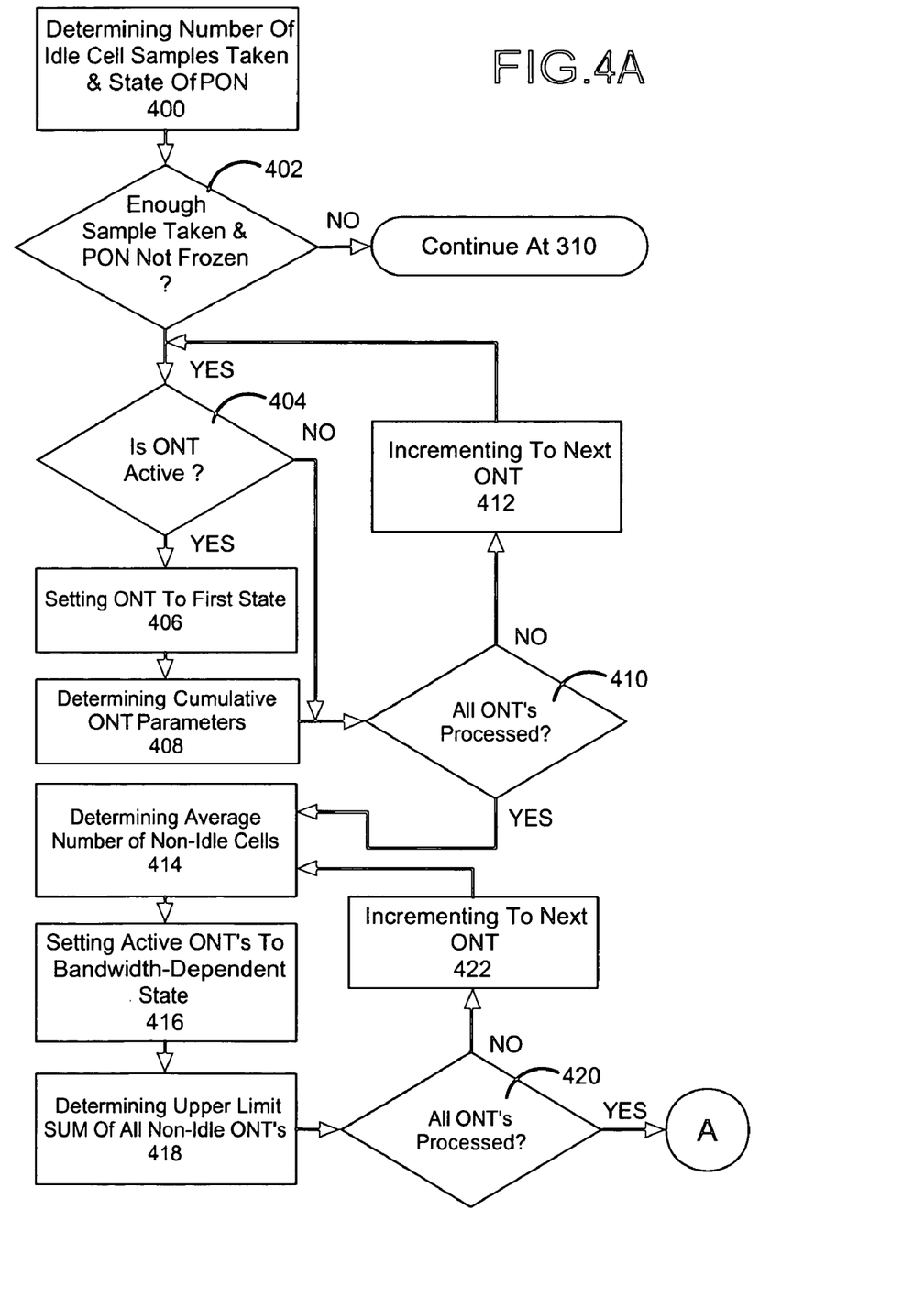
FIGS. 4A through 4D depict a firmware-based dynamic bandwidth allocation process in accordance with an embodiment of the disclosures made herein.
Figure 4B:
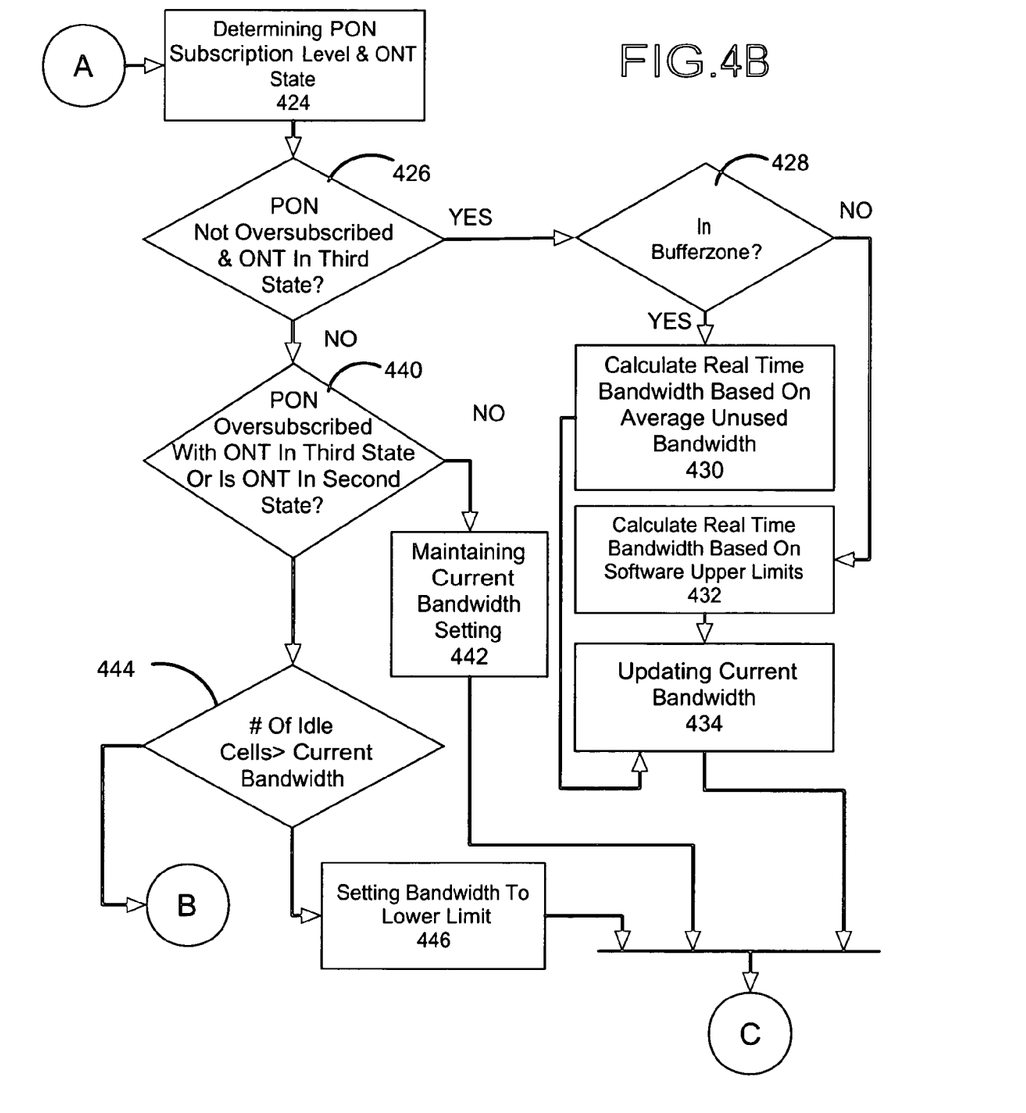
Figure 4C:
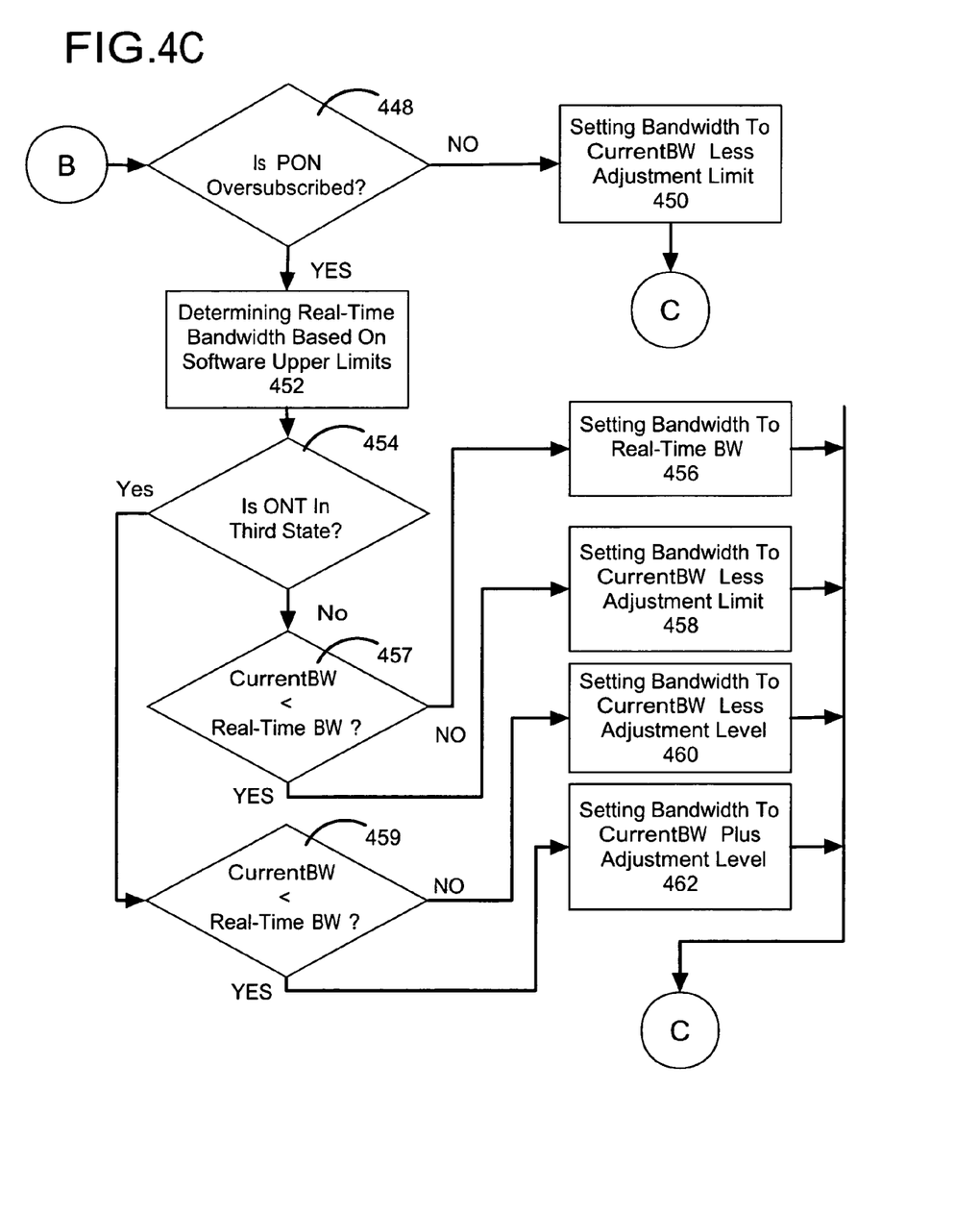
Figure 4D:
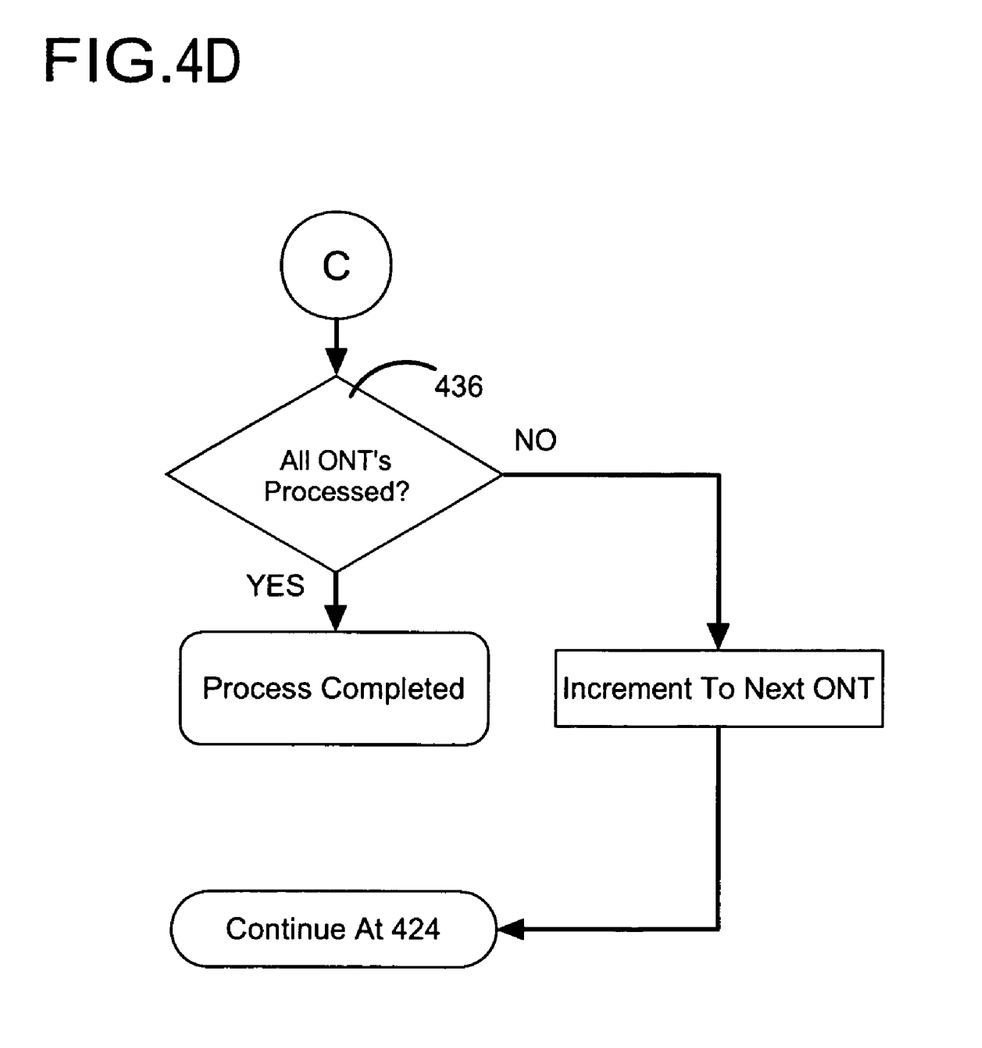

Referring now to FIG. 3, a method 300 for facilitating dynamic bandwidth allocation in accordance with an embodiment of the disclosures made herein is disclosed. The dynamic bandwidth allocation system 200 depicted in FIG. 2 is an embodiment of a system configured for carrying the method 300. At Block 305, initializing of a suitably configured dynamic bandwidth allocation system and corresponding dynamic bandwidth allocation variables is performed. At Block 310, monitoring for issuance of a dynamic bandwidth allocation interrupt (i.e., an interrupt) is performed. The softcore processor of the dynamic bandwidth allocation system polls its interrupt pins until a dynamic bandwidth allocation interrupt is identified (e.g., received). In this manner, the dynamic bandwidth allocation system is held in a wait loop until a dynamic bandwidth allocation interrupt is identified at one of the interrupt pins. Execution of dynamic bandwidth allocation firmware of the dynamic bandwidth allocation system is triggered by issuance and receipt of a dynamic bandwidth allocation interrupt, which is generated by hardware inside a field programmable gate array of the dynamic bandwidth allocation system.

Upon issuance of a dynamic bandwidth allocation interrupt, the processor of the dynamic bandwidth allocation system executes a firmware-based dynamic bandwidth allocation process at Block 315. In one embodiment of the firmware-based dynamic bandwidth allocation process, a processor of the dynamic bandwidth allocation system reads registers containing idle-cell information, and performs a series of operations to calculate new bandwidth parameters for the active ONTs on the PON. Once the calculations are complete, the processor updates a dynamic bandwidth allocation table with the new bandwidth values. This bandwidth allocation table is then used by hardware of the dynamic bandwidth allocation system (e.g., hardware inside a field programmable gate array of the dynamic bandwidth allocation system) to generate the appropriate amount of grants to the ONTs during a next grant cycle. Once the bandwidth allocation table is updated, the processor terminates (e.g., exits) the dynamic bandwidth allocation process and returns to monitoring for a next dynamic bandwidth allocation interrupt.

FIGS. 4A through 4D depict an embodiment of the firmware-based dynamic bandwidth allocation process of Block 315 in FIG. 3. An operation 400 is performed for determining the number of idle cell samples taken, the state (e.g., active or inactive) of the current ONT being processed and the state of the PON (e.g., locked of unlocked). If an insufficient number of sample idle cells were taken and the PON is not locked (at decision 402), the processor exits the process and returns to Block 310. If the number of idle cells samples taken is sufficient and the state of the PON is locked (at decision 402) in combination with the current ONT being processed being active (at decision 404), an operation 404 is performed for setting the current ONT (i.e., currently being processed) to a first state, followed by an operation 408 being performed for determining cumulative ONT parameters (i.e., summing a parameter value for all processed ONTs). A primary objective of setting the current ONT's to a first state is for enabling detection of active ONTs. In this way, load balancing for the softcore processor is accomplished such that it does not perform needless calculations on inactive ONTs.

Examples of such cumulative ONT parameters include a sum of idle cells for all processed ONTs, a sum of all non-idle cells for all processed ONTs and a number of idle cells for each ONT per sample read. Thereafter, if all active ONTs have not been processed (at decision 410), an operation 412 is performed for incrementing to the next ONT, followed by repeating the operations for setting the current ONT to the first state and determining cumulative ONT parameters.

After the operations for setting the current ONT to the first state and determining cumulative ONT parameters are performed for all of the active ONTs being processed, an operation 414 is performed for determining an average number of idle cells for a current ONT being processed, followed by an operation 416 for setting the current ONT to a respective bandwidth-dependent state and an operation 418 for determining an upper limit sum of all non-idle ONTs processed. The current ONT is set to a second state if it does not need any additional bandwidth and has a current bandwidth greater than a minimum specified bandwidth. If the current ONT does not meet these conditions, it is set to a third state. Thereafter, if all active ONTs have not been processed (at decision 420), an operation 422 is performed for incrementing to the next ONT, followed by repeating the operations for setting the current ONT to a respective bandwidth-dependent state.

After the operation for setting the current ONT to a respective bandwidth-dependent state is performed for all of the active ONTs being processed, an operation 424 is performed for determining a PON subscription level and a state of the current ONT. If the PON is not oversubscribed and the current ONT is in the third state (at decision 426) along with the PON being in a specified buffer zone (at decision 428), an operation 430 is performed for calculating a real-time bandwidth based on an average unused bandwidth. Otherwise, an operation 432 is performed for calculating a real-time bandwidth based on an upper limit of dynamic bandwidth allocation software. For the current PON, an operation 434 is then performed for updating its current bandwidth allocation dependent upon the appropriate one of the real-time bandwidth based on an average unused bandwidth or the real-time bandwidth based on the upper limit of dynamic bandwidth allocation software. Thereafter, if all active ONTs have not been processed (at decision 436), an operation 438 is performed for incrementing to the next ONT and the process continues at the operation 424.

If the PON is not over-subscribed with the current ONT in the third state (at decision 426) or the determination is made that the current ONT is not in the second state (at decision 440), an operation 442 is performed for maintaining the current bandwidth setting. Otherwise, if the number of idle cells for the current ONT is greater than the current bandwidth (at decision 444), an operation 446 is performed for setting the bandwidth to a specified lower limit. Thereafter, if all active ONTs have not been processed, the operation 438 is performed for incrementing to the next ONT and the process continues at the operation 424.

If the number of idle cells for the current ONT is not greater than the current bandwidth (at decision 444) and the PON is not oversubscribed (at decision 448), an operation 450 is performed for setting the bandwidth to a value equal to the current bandwidth less a specified adjustment limit. Thereafter, if all active ONTs have not been processed, the operation 438 is performed for incrementing to the next ONT and the process continues at the operation 424.

If the PON is oversubscribed (at decision 448), an operation 452 is performed for determining a real-time bandwidth based on upper limits of dynamic bandwidth software. If the current ONT is not in the third state (at decision 454), an operation 456 is performed for setting the bandwidth to the real-time bandwidth if the current bandwidth is not less than the determined real-time bandwidth (at decision 457) and an operation 458 is performed for setting the bandwidth to the current bandwidth less a specified adjustment limit if the current bandwidth is less than the determined real-time bandwidth (at decision 457). If the current ONT is in the third state (at decision 454), an operation 460 is performed for setting the bandwidth to the current bandwidth less a specified adjustment limit if the current bandwidth is not less than the determined real-time bandwidth (at decision 459) and an operation 462 is performed for setting the bandwidth to the current bandwidth plus a specified adjustment limit if the current bandwidth is less than the determined real-time bandwidth (at decision 459). Thereafter, if all active ONTs have not been processed, the operation 438 is performed for incrementing to the next ONT and the process continues at the operation 424.

As depicted in the firmware based dynamic bandwidth allocation process, a processor of a corresponding dynamic bandwidth allocation system checks for the state of the PON (locked or unlocked). At any time during operation, dynamic bandwidth allocation software in accordance with embodiments of the disclosures made herein is able to lock current calculated bandwidth on the PON and adjust the dynamic bandwidth allocation parameters of the PON to alter the dynamic bandwidth allocation functionality. For example, when a new ONT is added onto the PON or when bandwidth limit values of an ONT are changed, the PON needs to have its current bandwidth settings locked while the host dynamic bandwidth allocation software updates the information with the new settings.

As disclosed herein, the entire dynamic bandwidth allocation firmware can be reloaded while in-service. To do such code reload, all PON bandwidth values must first be locked and the processor of the dynamic bandwidth allocation system must be instructed to execute in accordance with instructions accessible from ROM of hardware comprising the dynamic bandwidth allocation firmware (e.g., the FPGA 202). At that time, the revised version of the dynamic bandwidth allocation firmware can be loaded into RAM of hardware comprising the dynamic bandwidth allocation firmware (e.g., the FPGA 202). When loading of the revised version of the dynamic bandwidth allocation firmware is complete, the softcore processor is subsequently instructed to resume operation from RAM of hardware comprising the dynamic bandwidth allocation firmware, followed by the PON being unlocked such that dynamic bandwidth allocation calculations resume.

Referring now to computer readable medium, methods, processes and/or operations adapted for carrying out dynamic bandwidth allocation functionality as disclosed herein are tangibly embodied by computer readable medium having instructions thereon for carrying out such functionality. In one specific embodiment, the instructions are tangibly embodied for facilitating in-service loading of a revised version of dynamic bandwidth allocation firmware in accordance with an embodiment of the disclosures made herein (e.g., as in the method 100 disclosed above). In another specific embodiment, the instructions are tangibly embodied for facilitating dynamic bandwidth allocation in accordance with an embodiment of the disclosures made herein (e.g., as in the method 300 disclosed above). The instructions may be accessible by one or more data processors (e.g., of one or more functional modules within a PON) from a memory apparatus (e.g. RAM, ROM, virtual memory, hard drive memory, etc), from an apparatus readable by a drive unit of the data processing system (e.g., a diskette, a compact disk, a tape cartridge, etc) or both. Accordingly, examples of computer readable medium include a compact disk or a hard drive that has imaged thereon a computer program (i.e., a set of instructions) adapted for carrying various aspects of dynamic bandwidth allocation functionality as disclosed herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and the scope of the appended claims.

What is claimed is:

1. A bandwidth allocation system, comprising:
   dynamic bandwidth allocation software including an image representing firmware configured for determining bandwidth allocation requirements;
   a first processor that interprets said firmware for facilitating determination of bandwidth allocation settings for a plurality of optical network termination units of a Passive Optical Network system;
   a second processor interpreting said software for managing information upon which said bandwidth allocation settings are dependent, determining revised bandwidth allocation parameters for altering the bandwidth allocation settings, and configuring the revised version of said bandwidth allocation parameters for said firmware prior to loading said firmware,
   wherein said revised bandwidth allocation functionality includes one of: adjusting a bandwidth recalculation time interval, calculating a bandwidth adjustment amount, calculating a number of idle cells to be received for initiating a bandwidth recalculation operation, and calculating a buffer zone size;
   first memory from which a current version of said firmware is accessible by the first processor; and
   second memory from which said software is accessible by the second processor, wherein said second memory is different than said first memory.

2. The system of claim 1 wherein said firmware and the first processor are comprised by a field programmable gate array.

3. The system of claim 1:
   wherein said first memory includes a portion from which a current version of said firmware is accessible and a portion including instructions that the first processor executes in accordance with during upgrade to a revised version of said firmware.

4. The method of claim 3 wherein the first processor and said first memory are comprised by a field programmable gate array.

5. The system of claim 3 wherein the revised version of said firmware provides for altered bandwidth allocation functionality with respect to the current version of said firmware.

6. The system of claim 1 wherein the first processor:
   analyzes idle-cell information;
   determines bandwidth allocation parameters dependent upon said idle-cell information; and
   facilitates transmission of at least a portion of said bandwidth allocation parameters to a processor of the Passive Optical Network system.

7. The system of claim 1 wherein said software is configured for facilitating in-service alteration of bandwidth allocation functionality, wherein facilitating in service alteration of bandwidth allocation functionality includes facilitating in-service upgrading of said firmware.

8. The system of claim 1 wherein said software is configured for:
   creating a revised version of said firmware;
   instructing the first processor to achieve an idle state;
   loading the revised version of said firmware to said first memory while the first processor is in the idle state; and
   instructing the first processor to execute in accordance with said firmware after loading the revised version of said firmware.

9. The system of claim 8, further comprising:
   at least one grant generator, wherein said at least one grant generator operates in accordance with last-known bandwidth settings with respect to instructing the first processor to achieve the idle state.

10. The system of claim 1, further comprising:
    software configured for facilitating at least one of altering a bandwidth recalculation time interval, altering a bandwidth adjustment amount, altering a number of idle cells to be received for initiating a bandwidth recalculation operation, and altering a buffer zone size, wherein said software performs such altering without having to freeze bandwidth allocation calculations.

11. The system of claim 1, further comprising:
    at least one grant generator configured for producing data grants in accordance with said bandwidth allocation settings.

12. The system of claim 11 wherein said firmware, the first processor and said at least one grant generator are comprised by a common system hardware element.

13. The system of claim 12 wherein the common system hardware element is a field programmable gate array.

14. A method for facilitating bandwidth allocation in a network system, comprising:
    discontinuing operation of a first processor in accordance with dynamic bandwidth allocation firmware residing in first memory;
    determining bandwidth allocation settings independent of said dynamic bandwidth allocation firmware;
    receiving a revised version of said bandwidth allocation firmware to said first memory;
    resuming operation of the first processor in accordance with the revised version of said bandwidth allocation firmware after performing loading of said revised version, thereby enabling in-service upgrade of said firmware;
    determining revised bandwidth allocation parameters for altering bandwidth allocation functionality;
    configuring the revised version of said bandwidth allocation firmware to reflect said revised bandwidth allocation parameters, wherein configuring the revised version of the bandwidth allocation firmware is performed prior to loading the revised version of the bandwidth allocation firmware;
    wherein said determining revised bandwidth allocation parameters and configuring the revised version are facilitated by a second processor executing in accordance with dynamic bandwidth allocation software accessible from second memory different than said first memory;
    wherein said configuring the revised version includes altering a current version of said firmware for providing revised bandwidth allocation functionality;
    wherein said revised bandwidth allocation functionality includes one of: adjusting a bandwidth recalculation time interval, calculating a bandwidth adjustment amount, calculating a number of idle cells to be received for initiating a bandwidth recalculation operation, and calculating a buffer zone size.

15. The method of claim 14 wherein determining bandwidth allocation settings independent of said dynamic bandwidth allocation firmware includes instructing a grant generator to determine bandwidth allocation settings in accordance with last-known bandwidth settings with respect to instructing the first processor to discontinue execution in accordance with said dynamic bandwidth allocation firmware.

16. The method of claim 14 wherein:
    discontinuing operation of the first processor in accordance with dynamic bandwidth allocation firmware includes determining last-known bandwidth allocation settings and instructing the first processor to achieve an idle state; and determining said bandwidth allocation settings independent of said dynamic bandwidth allocation firmware is performed in accordance with said last-known bandwidth allocation settings.

17. A bandwidth allocation system, comprising:
at least one data processing device;
first memory;
second memory different than said first memory;
instructions processable by said at least one data processing device; and
an apparatus within a Passive Optical Network from which said instructions are accessible by said at least one data processing device;
wherein said instructions am configured for enabling said at least one data processing device to facilitate:
discontinuing operation of a first processor in accordance with dynamic bandwidth allocation firmware residing in first memory;
determining bandwidth allocation settings independent of said dynamic bandwidth allocation firmware;
receiving a revised version of said bandwidth allocation firmware to said first memory; and
resuming operation of the first processor in accordance with the revised version of said bandwidth allocation firmware after performing loading of said revised version, thereby enabling in-service upgrade of said firmware:
wherein said instructions are further configured for enabling said at least one data processing device to facilitate:
determining revised bandwidth allocation parameters for altering bandwidth allocation functionality; and
configuring the revised version of said bandwidth allocation firmware to reflect said revised bandwidth allocation parameters, wherein configuring the revised version of the bandwidth allocation firmware is performed prior to loading the revised version of the bandwidth allocation firmware;
wherein said determining revised bandwidth allocation parameters and configuring the revised version are facilitated by a second processor executing in accordance with dynamic bandwidth allocation software accessible from second memory different than said first memory;
wherein said revised bandwidth allocation functionality includes one of:
adjusting a bandwidth recalculation time interval, calculating a bandwidth adjustment amount, calculating a number of idle cells to be received for initiating a bandwidth recalculation operation, and calculating a buffer zone size.

18. The system of claim 17 wherein determining bandwidth allocation settings independent of said dynamic bandwidth allocation firmware includes instructing a grant generator to determine bandwidth allocation settings in accordance with last-known bandwidth settings with respect to instructing the first processor to discontinue execution in accordance with said dynamic bandwidth allocation firmware.

19. The system of claim 17 wherein:
discontinuing operation of the first processor in accordance with dynamic bandwidth allocation firmware includes determining last-known bandwidth allocation settings and instructing the first processor to achieve an idle state; and
determining said bandwidth allocation settings independent of said dynamic bandwidth allocation firmware is performed in accordance with said last-known bandwidth allocation settings.

20. The system of claim 17 wherein configuring the revised version includes altering a current version of said firmware for providing revised bandwidth allocation functionality.

21. The system of claim 20 wherein said revised bandwidth allocation functionality includes at least one of functionality dependent upon a bandwidth recalculation time interval, functionality dependent upon a bandwidth adjustment amount, functionality dependent upon a number of idle cells to be received for initiating a bandwidth recalculation operation, and functionality dependent upon a buffer zone size.

* * * * *